Nov. 16, 1965  J. ADAM  3,217,788
METHOD AND APPARATUS FOR INDIVIDUAL ADJUSTMENT OF ROOM
TEMPERATURE CONNECTED TO A COMMON PRIMARY AIR SUPPLY
Filed July 9, 1963
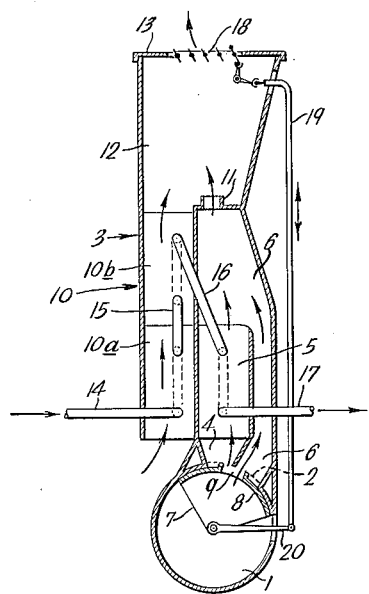
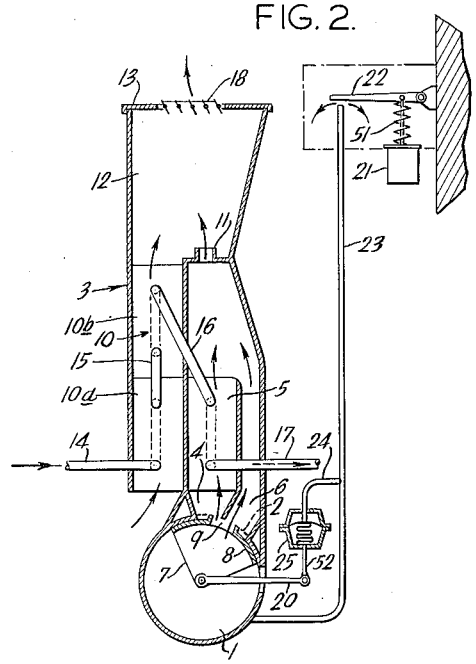
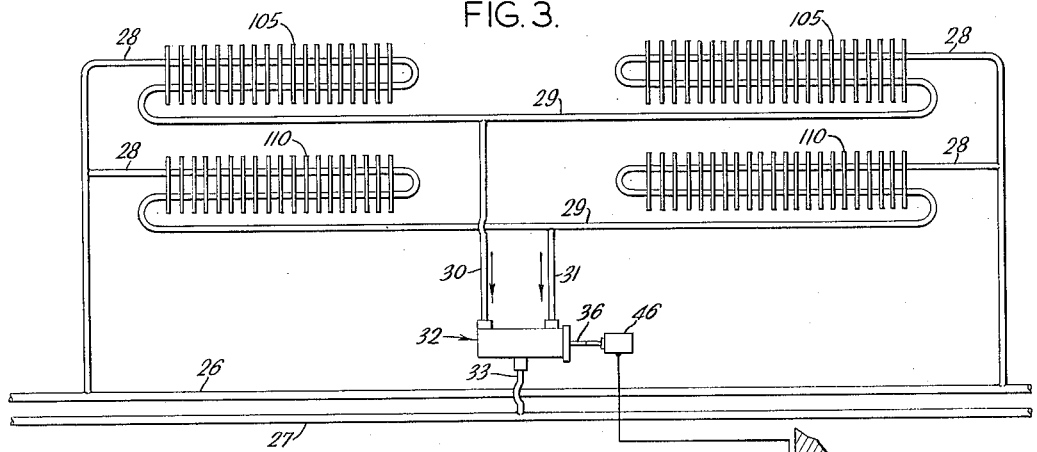
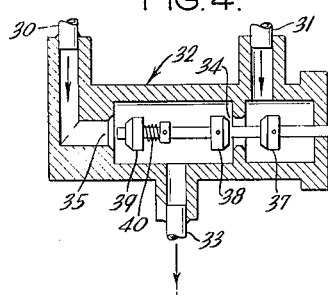
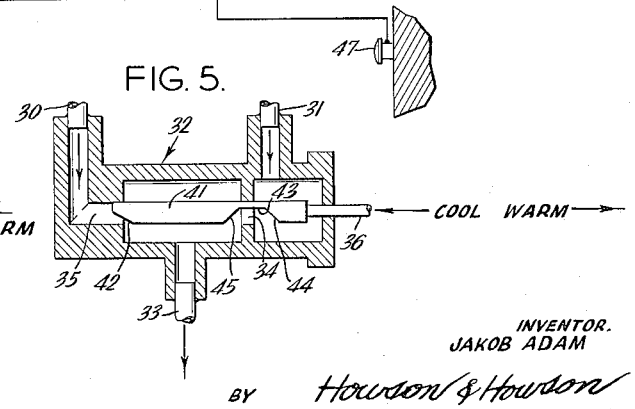
INVENTOR.
JAKOB ADAM
BY Howson & Howson
ATTYS.

United States Patent Office 3,217,788
Patented Nov. 16, 1965

3,217,788
METHOD AND APPARATUS FOR INDIVIDUAL ADJUSTMENT OF ROOM TEMPERATURE CONNECTED TO A COMMON PRIMARY AIR SUPPLY
Jakob Adam, Giessen (Lahn), Germany, assignor to Aktiebolaget Svenska Flaktfabriken, Stockholm, Sweden
Filed July 9, 1963, Ser. No. 293,907
11 Claims. (Cl. 165—2)

This invention relates to a method and apparatus for adjustment of the temperature in individual rooms which are connected to a common air-conditioning system by employing air-conditioning units for each room. Fresh, usually pre-conditioned admission air is utilized as the primary air and is mixed immediately prior to its entrance into each room with room air which acts as the secondary air, whereafter the air mixture is introduced into the room.

Several methods for individual adjustment of the temperature in a room are known in the prior art. According to one of the known methods, the primary air is fed into the room air-conditioning unit which by injector effect sucks in room air as secondary air. The secondary air, immediately prior to being sucked into the unit, is subjected to thermal treatment by means of a battery of heat exchangers, in order, subsequent to its mixing with the primary air, to provide the air mixture to be delivered into the room with the desired temperature. According to another known method, secondary air is also sucked in by the primary air fed into the air-conditioning unit and mixed with primary air. Thereafter the air mixture is passed entirely or partially through a treating device in the air-conditioning unit where it is given the desired temperature required for heating or cooling the room and is thereafter then supplied from the unit into the room.

The two aforesaid methods, however, have a considerable disadvantage, because the individual adjustment of the room temperature by adjusting the temperature of the water in the heat exchangers by means of a water valve individually or in combination with an air control flap is more or less limited when the temperature of the water in the heat exchange battery for the secondary air or air mixture approaches the room air as secondary air. The smaller the difference in temperature between the secondary air or air mixture to be treated in the treating device and the water temperature in the heat exchange battery, the less the chance of influencing the secondary air and air mixture respectively by the treating device. This disadvantage becomes particularly evident in the transition periods from cold to warm seasons, during which periods the water temperature of the heat exchange battery differs only slightly from the temperature of the room air or the fresh air to be treated.

The same disadvantage is also inherent in another method wherein the temperature of the air supplied to the room is adjusted exclusively by thermal after treatment of the primary air prior to its mixing with the secondary air, and where the secondary air is not subjected to thermal treatment. Neither this method nor the aforementioned methods render satisfactory temperature adjustment, particularly during the transition periods and warm seasons when there is only a slight difference between the water temperature in the heat exchange battery for treating the primary air and the air to be treated.

This invention has as its principal object to overcome the afore-mentioned disadvantages. According to the invention, this object is achieved in that both the primary air and the secondary air prior to their mixing are subjected to thermal treatment in separate heat exchangers, in such a manner, that the thermal treatment temperature, that is the surface temperature of the heat exchangers, is maintained between the temperature of the secondary air and the temperature of the primary air. In this manner it is possible to effect in every season, satisfactory individual adjustment of the temperature in every room of a plurality of rooms connected to a common air-conditioning system, because there is always a sufficiently large difference between the temperature either of the primary air or of the secondary air and the temperature of the heat exchangers. For producing cooling effect, for example, in summer when the water temperature of the heat exchanger is usually about the same as the temperature of the primary air, the necessary cooling capacity can be obtained by a corresponding cooling of the secondary air, which secondary air in this case is considerably warmer than the cool water of the heat exchanger.

The thermal treatment of the primary and/or secondary air may be adjusted in such a manner, that the primary and/or secondary air is passed entirely through the treating device, or entirely through a by-pass line, or in an optional proportion partly through the treating device and partly through the by-pass line. In this manner, the air mixture to be delivered into the room can be brought to any desired temperature.

The adjustment may also be effected by changing the surface temperature of the heat exchanger is question. It is also possible to carry out the thermal treatment of the primary air by adjusting the amount of the air passed along its heat exchanger, and the thermal treatment of the secondary air by changing the surface temperature of the other heat exchanger, or vice versa.

A room air-conditioning unit specially adapted for carrying out the above-described method is characterized in that each of the thermal treatment devices for the primary air and secondary air comprises at least one heat exchanger with a heating or cooling medium supplied thereto, wherein the water outlet of the heat exchanger for the secondary air may be connected to the water inlet for the primary air thus providing a series type water flow. As an alternative, the heat exchanger for the primary air and the heat exchanger for the secondary air may be connected in parallel to the common water system or each to a separate water system.

Further details and other advantages of the invention appear from the following description and claims taken in conjunction with the accompanying drawings in which:

FIG. 1 shows a vertical section through a room air-conditioning unit with manual control constructed in accordance with the present invention;

FIG. 2 shows a vertical section through another embodiment equipped with a room sensing device for automatic control of the unit;

FIG. 3 is a schematic of the connection of the heat exchangers for the primary air and secondary air to a common water system having a flow-through control valve for controlling the water flow through the heat exchangers;

FIG. 4 is an enlarged longitudinal sectional view of an embodiment of the control valve shown in FIG. 3; and FIG. 5 is an enlarged longitudinal sectional view of another embodiment of the valve illustrated in FIG. 3.

Both embodiments shown in FIGS. 1 and 2 comprise a feed line 1 of circular cross-section for primary air. The line 1 is provided with an outlet 2 to the air-conditioning unit 3 of the room to be air-conditioned individually. The outlet 2 is in registry with first and second separate channels 4 and 6 respectively, channel 4 being a supply channel for a treating device 5 and channel 6 being a by-pass channel extending parallel to the treating device 5. The inlets of the two channels 4 and 6 are adjustable by a control valve 7 comprising a curved disk 8 abutting the wall of feed line 1 and provided with an outlet 9 for the primary air. According to the position of outlet 9 relative to the inlets of the channels 4 and 6, as effected by the position of disk 8, a greater or lesser quantity of primary air is delivered into each of the two channels. It is, of course, also possible to adjust valve 7 in such a manner, that the primary air is directed exclusively via channel 4 through the treatment device 5 or exclusively through the by-pass channel 6 without being subjected to treatment.

To the side of the treating device 5, the air-conditioning unit 3 is provided with a second treating device 10, through which the secondary air, which is sucked into the air-conditioning unit 3 below the treating device at the lower side of said unit, is passed for thermal after treatment. The secondary air is sucked into the treating device 10 in a known manner, in that the primary air subsequent to its passing through the treating device 5 and the by-pass channel 6 respectively flows into a mixing chamber 12 through air nozzles 11. In this manner, a suction effect is produced on the secondary air contained in the treating device 10, and the secondary air is sucked through the treating device 10 into the mixing chamber 12. From the chamber 12 the primary air and the secondary air leave the air-conditioning unit in mixed state through a grate in the upper end plate 13 of the air-conditioning unit and enter the room to be air-conditioned.

The treating devices 5 and 10 for the primary and secondary air may be water-supplied heat exchangers, as is the case with the embodiments shown on the drawing, where both heat exchangers are connected to one and the same water main system. The lower battery 10a of the two heat exchange batteries of the treating device 10 for the secondary air is with its water inlet 14 connected to the water feed line and communicates via a connecting line 15 with the upper battery 10b of the treating device. The batttery 10b is connected with the heat exchanger of the treating device 5 for the primary air via a second connecting line 16, the water exchanger communicating via outlet 17 with the water return line. In summary, the heating or cooling water for the heat exchangers enters the treating device 10 for the secondary air at the water inlet 14, and is then, after a slight change in its temperature caused by the secondary air it has treated, transferred into treating device 15 for the primary air in order to subject this air to thermal after-treatment.

The control valve 7 may be adjusted in different ways. In the embodiment shown in FIG. 1, the adjustment is made by a manual control 18 disposed on the upper end plate 13 of the air-conditioning unit and connected by a Bowden wire 19 or the like to an adjusting lever 20 connected to the control valve 7. In the embodiment shown in FIG. 2, however, the adjustment of control valve 7 is made automatically by a room sensing means 21 comprising a cylindrical bellows 51, with a definite amount of air enclosed therein, and a swinging member 22. The bellows 51 actuates the swinging member 22 responsive to the expansion of the bellows 51 and closes or opens, depending upon whether the bellows expands or contracts, the outlet of an air line 23 connected to the primary air feed line 1. A tie line 24 branching off the air line 23 leads to a control diaphragm 25 which, according to its position caused by the air pressure produced thereon determines the position of the adjusting lever 20 of the control valve 7, which is connected to the diaphragm by a motion-transferring connection 52.

The adjustment of the air temperature may also be effected by adjusting the water temperature of the heat exchangers. FIG. 3 shows a system employing such a method of adjustment. As is illustrated, the heat exchangers 105 and 110, for primary and secondary air respectively, are connected via lines 28 to a common water supply line 26 and via lines 29, 30, 31, through a control valve 32 and a line 33, to the water return line 27. In the embodiments illustrated in FIGS. 4 and 5, the control valve 32 is provided with two flow-through openings 34 and 35 for the heating or cooling media flowing through the heat exchanger 110 and 105 respectively, in such a manner, that the medium flowing from the secondary air heat exchangers 110 passes through the opening 34, and the medium fed to the primary air heat exchangers 105 passes through the opening 35. The medium entering the casing of the control valve from the lines 30 and 31 are then discharged into the line 33 leading to the common water return line 27.

The two flow-through openings 34 and 35 are adjustable by valve means which in the embodiment shown in FIG. 4 comprise three discs or plunger-shaped valve elements 37, 38 and 39 mounted on the longitudinally displaceable valve actuating rod 36. The two upper discs 37 and 38 are located on opposite sides of the upper flow-through opening 34 and double acting such that the opening 34 is closed in one position of the actuating rod 36 by one of the discs, and in the other position by the other of the discs.

The lower flow-through opening 35, however, is throttled by the third valve disc 39, the position of the third valve disc relative to the two first mentioned valve discs 37 and 38 is chosen such, that upon moving the valve actuating rod 36 from its upper position into its lower position the intermediate valve disc 38 first opens gradually the upper flow-through opening 34 whereafter the lowermost valve disc 39 mounted on the rod gradually closes the lower flow-through opening 35, and thereafter the valve disc 37 gradually closes the upper opening 34. In order that the lower valve means 37 in its closing position allows subsequent closing of the upper flow-through opening 34 by the upper valve disc 37, the valve disc 39 is mounted such, that it can be displaced longitudinally on the valve rod 36 by action of a spring 40.

In the embodiment of the control valve 32 shown in FIG. 5, the valve closure means on the rod 36 comprises a single pin-shaped body 41 having at its lower end, which controls the supply from the line 30, a beveled surface 42. The pin body 41 has in the area of the upper valve seat 34, a constriction 43 with two adjacent beveled surfaces 44 and 45 for adjusting the supply from the line 31. The relative position of the valve surfaces 42, 44 and 45 is chosen such, that they open and close the flow-through openings 34, 35 in the same manner as the valve means 37, 38, 39 in the embodiment shown in FIG. 4.

In both embodiments, the valve rod 36 is actuated via a drive mechanism 46 controlled by a thermostat 47 placed in the room to be air-conditioned.

What I claim is:

1. A method for adjusting the temperature in individual rooms having individual air conditioning units connected to a duct supplying pre-conditioned air; including the steps of feeding secondary air into a portion of at least one of said units, feeding into another portion of said unit primary air from said duct at a temperature different than the temperature of said secondary air, inducing the movement of secondary air into a mixing portion of said unit by passing said primary air through a constricted opening adjacent said secondary air path in said unit, mixing the primary and secondary air in said mixing portion and thereafter feeding said mixture into the room to be treated, including the improved steps of thermally treating both the primary and secondary air separately in said unit prior to the mixing step by providing separate heat exchanger means in said unit in the path of said primary air and said secondary air, and maintaining the surface temperature of the heat exchanger means between the temperature of the secondary and primary air.

2. A method for adjusting the temperature in individual rooms in accordance with claim 1 including the step of; maintaining the supplied primary air from said duct at a temperature below the temperature of the secondary air.

3. A method for adjusting the temperature in individual rooms in accordance with claim 1 including the steps of; bypassing at least some of said primary air around the thermal heat exchanger in the path of said primary air so as to permit at least a portion of said primary air to be thermally untreated, and thereafter mixing said untreated primary air with said treated primary and secondary air.

4. A method for adjusting the temperature in individual rooms in accordance with claim 3 including the step of; providing an air control valve operable to selectively proportion the quantity of primary air bypassing said heat exchanger.

5. An air conditioning unit for adjusting the temperature in an individual room, said unit comprising an enclosure having a primary air inlet for permitting entry of primary air and a secondary air inlet for permitting entry of room air, a first and second channel formed in said enclosure, said channels registering with said primary air inlet and a control valve mounted in said air inlet to selectively connect said primary air to either of said channels individually or to both of said channels simultaneously, a first heat exchanger mounted in said first channel to treat the primary air as it passes therethrough, a third channel formed in said enclosure registering with the secondary air inlet, a second heat exchanger mounted in said third channel to treat said secondary air as it passes therethrough, means to maintain a surface temperature in said heat exchangers between the temperature of said primary and said secondary air, a mixing chamber formed in said enclosure, said first and second channels merging into at least one constricted opening, said constricted opening being in fluid communication with said chamber and being positioned to induce the passage of secondary air through its associated heat exchanger into said chamber, and an outlet from said mixing chamber to permit the discharge of said mixed primary and secondary air from said mixing chamber.

6. An air conditioning unit for adjusting the temperature in an individual room in accordance with claim 5, wherein said heat exchangers have water inlets and water outlets, said water inlet of one of said heat exchangers being connected to the water outlet of said other heat exchanger.

7. An air conditioning unit for adjusting the temperature in an individual room in accordance with claim 5, wherein said heat exchangers have water inlets and water outlets, each of said water inlets having means connecting them to separate water supplies.

8. An air conditioning unit for adjusting the temperature in an individual room in accordance with claim 5, wherein said heat exchangers have common water inlets and common water outlets.

9. An air conditioning unit for adjusting the temperature in an individual room in accordance with claim 5, wherein said heat exchangers have separate water inlets and common water outlets.

10. An air conditioning unit for adjusting the temperature in an individual room, said unit comprising an enclosure having a primary air inlet for permitting entry of primary air and a secondary air inlet for permitting entry of room air, said secondary air inlet separated from said primary air inlet, a control valve mounted in said primary air inlet, a first and second channel formed in said enclosure and in registry with said valve, said valve having an air outlet to selectively connect said primary air to either of said channels individually or to both of said channels simultaneously, said channels merging into a constricted opening at the outlet of said channels, and a mixing chamber formed in said enclosure in fluid communication with said constricted opening downstream of said opening and terminating in an outlet to the individual room being conditioned, a third channel formed in said enclosure connecting said secondary air inlet with said mixing chamber, a first heat exchanger mounted in said first channel to treat the primary air as it passes therethrough, a second heat exchanger mounted in said third channel to treat said secondary air as it passes therethrough, each of said heat exchangers having an inlet and an outlet, and means to supply each of said inlets with a cooling medium, a cooling medium control valve positioned between the outlets of said heat exchangers, and means in said valve to regulate the flow of cooling medium through said heat exchangers, said regulating means responsive to a room temperature sensing means mounted within said room said conditioner is supplying, said cooling medium being supplied having a temperature such as to maintain a surface temperature in said heat exchangers between the temperature of said primary and said secondary air, said constricted opening positioned to induce the passage of secondary air through its associated heat exchanger into said mixing chamber whereby the treated primary, secondary, and untreated primary air is mixed prior to its entry into said room.

11. An air conditioning unit for adjusting the temperature in an individual room in accordance with claim 10 wherein said water inlets of said heat exchangers are in parallel.

References Cited by the Examiner

UNITED STATES PATENTS

| | | | |
|---|---|---|---|
| 1,395,938 | 11/1921 | Barducci | 98—38 |
| 1,889,588 | 11/1932 | Anderson | 165—103 |
| 1,949,735 | 3/1934 | Bulkeley | 165—16 |
| 1,990,468 | 2/1935 | Bridges | 165—103 |
| 2,000,597 | 5/1935 | Keyes | 165—59 |
| 2,140,305 | 12/1938 | Ashley et al. | 98—38 |
| 2,202,946 | 6/1940 | Carrier | 165—2 |
| 2,327,664 | 8/1943 | Otis | 98—38 |

ROBERT A. O'LEARY, *Primary Examiner.*

CHARLES SUKALO, *Examiner.*